United States Patent [19]

Pan

[11] Patent Number: 6,103,997
[45] Date of Patent: Aug. 15, 2000

[54] HIGH HARDNESS AND WEAR-RESISTING FLUX CORED WIRE

[76] Inventor: Guoxi Pan, No. 39, Baimiao Road, Jinmen City, Huebi Province 448000, China

[21] Appl. No.: 09/230,056

[22] PCT Filed: May 28, 1997

[86] PCT No.: PCT/CN97/00052

§ 371 Date: Jan. 14, 1999

§ 102(e) Date: Jan. 14, 1999

[87] PCT Pub. No.: WO98/02274

PCT Pub. Date: Jan. 22, 1998

[30] Foreign Application Priority Data

Jul. 15, 1996 [CN] China ................................ 96102347

[51] Int. Cl.⁷ .................................................. B23K 35/30
[52] U.S. Cl. ............................. 219/145.22; 219/146.1; 219/137 WM; 219/137 R; 219/136
[58] Field of Search .......................... 219/145.22, 146.1, 219/137 WM, 137 R, 136; 148/22, 23, 24

[56] References Cited

U.S. PATENT DOCUMENTS

| | | | |
|---|---|---|---|
| 3,800,120 | 3/1974 | Helton et al. .......................... | 219/146 |
| 3,868,487 | 2/1975 | Ito et al. .................................. | 219/73 |
| 4,109,059 | 8/1978 | De Haeck .............................. | 428/558 |
| 4,149,063 | 4/1979 | Bishel ................................ | 219/146.23 |
| 4,282,420 | 8/1981 | Banks ................................ | 219/146.24 |
| 4,800,131 | 1/1989 | Marshall et al. ....................... | 428/558 |
| 5,192,016 | 3/1993 | Araki et al. ............................ | 228/147 |
| 5,550,348 | 8/1996 | Masaie et al. ..................... | 219/145.22 |

FOREIGN PATENT DOCUMENTS

| | | | |
|---|---|---|---|
| 61-001497 | 1/1986 | Japan .............................. | B23K 9/23 |
| 61-283489 | 12/1986 | Japan ............................. | B23K 35/30 |
| 63-115696 | 5/1988 | Japan . | |
| 94047193 B2 | 6/1994 | Japan .......................... | B23K 35/368 |
| 2088392 C1 | 8/1997 | Russian Federation ....... | B23K 35/36 |

*Primary Examiner*—Patrick Ryan
*Assistant Examiner*—M. Alexandra Elve
*Attorney, Agent, or Firm*—Fliesler, Dubb, Meyer & Lovejoy

[57] ABSTRACT

A high hardness flux cored wire for welding cold rolled metals is provided. The wire comprises a powdered flux containing a flux core powder wrapped by a low carbon steel sheet. The sheet is formed into a cylindrical structure, which is then extruded and drawn into the finished flux cored wire. The flux cored wire is used for welding cold rolled metals, and provides for strong welds having hardnesses in the range of HRC 62–69. The improved wire is inexpensive and easily manufactured.

11 Claims, No Drawings

HIGH HARDNESS AND WEAR-RESISTING FLUX CORED WIRE

PRIORITY CLAIM

This application claims priority to International application Ser. No.: PCT/CN97/00052, filed May 28, 1997.

TECHNICAL FIELD OF THE INVENTION

The present invention relates to a high hardness and wear-resistant flux cored welding wire, and particularly to a welding wire for repairing and welding cold rolled metals such as steel.

BACKGROUND ART

Conventional stock welding material is mainly made of rare and noble metals, such as nickel, chromium, niobium, cobalt, etc., as main ingredients, and of carbon as an additional component. The prior art has the defects that the source of the material is insufficient and that the cost is high. On the other hand, carbon is used for enhancing the hardness. However, cracks appear when the hardness reaches HRC 58. Even if quenching processes are performed to enhance the hardness, the hardness may only reach to HRC 58 and the failure rate is high, which results in waste. As for cold rolled stock welding material, such as steel, its hardness should reach over HRC 60. Some American specialists drew a conclusion that it is impossible for stock welding material to reach HRC 60. Soviet experts also had an opinion that it is normal and certain for stock welding to produce cracks when its hardness reaches HRC 60.

A welding wire which is made of tungsten carbide, available from Stellite Welding Material Co. Ltd. (Shanghai), has a hardness of only HRC 52–58. Cracks appear when the hardness is higher.

A stock welding flux cored wire made of tungsten carbide, available from Jingluo Welding Wire Company in Luohe city of Henan Provence in China, of the type TO-8705, has a hardness of HRC 52–58. Cracks appear when the hardness is higher.

Moreover, the hardness of the two kinds of stock welding material mentioned above is enhanced by quenching, but it still can not reach HRC 60, their maximum hardness being only HRC 58. The quenching time is long and electricity consumption is high, as a result, the cost is high. This kind of stock welding material can only be used for hot rolled processes. As for repairing cold rolled processes, there is still no suitable stock welding material so far.

OBJECTS OF THE INVENTION

It is an object of the invention to provide a high hardness and wear-resistant flux cored wire in order to overcome the foregoing defects. The hardness of the wire can reach HRC 62–65, even to HRC 66–69, and it can be used for repairing cold rolled metals. Therefore, it has high value.

It is another object of the invention to provide a method for manufacturing a high hardness and wear-resistant flux cored wire. Wire made by this method can be used for repairing cold rolled metals.

SUMMARY OF THE INVENTION

In order to achieve the above objects, according to one aspect of the present invention, there is provided a high hardness and wear-resistant flux cored welding wire comprising a flux core and a skin layer, wherein the flux core has a composition in weight percentage containing:

molybdenum: 1–10%,
tungsten: 1–10%,
graphite: 1–10%,
nickel: 1–7%,
vanadium: 2–10%,
chromium: 20–40%,
sodium silicon fluoride: 5–15%,
niobite: 1–10%,
boron: 10–25%,
silica sand: 2–10%, and
rare earth: 1–8%.

The diameter of the wire is about 1.0–about 4.0 mm. The skin layer is of a thickness of about 0.25–0.6 mm, which is made of low carbon steel, preferably of low carbon steel H08A.

According to another aspect of the present invention, there is provided a method for manufacturing a high hardness and wear-resistant flux cored wire, comprising the steps of:

(a) preparing a raw material of a flux core having a composition as defined above, (b) grinding the raw material into a flux core powder and stirring thoroughly;

(c) preparing a low carbon steel strip;

(d) placing said flux core powder onto the steel strip;

(e) winding the steel strip around the flux core powder to enclose the powder in a tube of steel;

(f) extruding and pressing the obtained structure into a cylindrical wire; and (g) drawing said cylindrical wire with a wire drawing machine and obtaining the wire.

The wire can be used for repairing and welding cold rolled metal, without cracks, at ambient temperature. The mechanical performance of the flux cored wire meets standard performance requirements. After repaired and welded, the rolled metal is machined with a lather or a grinder to achieve a required dimension.

Compared with the prior art, the high hardness and wear-resistant flux cored wire of the present invention has the following advantages:

1. It is practical for repairing and welding cold rolled metal with high economic efficiency;
2. It is not prone to cracking;
3. It has a hardness of at least HRC 62–65, even as high as HRC 66–69, and has good wear-resistance; and
4. Manufacture of the flux cored wire is simple and inexpensive.

DETAILED DESCRIPTION OF PREFERRED EMBODIMENTS

Embodiment 1

A core is made by preparing a raw material of the composition in weight % as follows:

molybdenum: 10%,
tungsten: 1%,
graphite: 1%,
nickel: 7%,
vanadium: 2%,
chromium: 20%,
sodium silicon fluoride: 15%,
niobite: 1%, boron 25%, silica sand: 10%, and rare earth: 8%.

These materials were ground into a powder, were stirred thoroughly, and were placed onto a low carbon steel (H08A) strip with a thickness of 0.3 mm. The sheet was wound around the flux powder core and was pressed to obtain a cylindrical structure. The cylindrical structure was then extruded with an extrusion apparatus. The wire was then drawn out to thin the wire, with a wire drawing machine, until the diameter of the wire was in the range of 1.0–4.0 mm.

Embodiment 2

In another embodiment, a core is made by preparing a raw material having a composition in weight % as follows:

molybdenum: 1%, tungsten: 10%, graphite: 5%, nickel: 1%, vanadium: 10%, chromium: 40%, sodium silicon fluoride: 5%, niobite: 10%, boron: 1%, silica sand: 2%, and rare earth: 1%.

The raw material was ground into a powder, was stirred thoroughly, and was placed onto a low carbon steel (H08A) strip having a thickness of 0.5 mm. The strip was wound around the powdered core flux material and was pressed to obtain a cylindrical structure. The cylindrical structure was then extruded into a cylindrical wire having a core using an extrusion apparatus. The wire was then drawn out with a wire drawing machine until the diameter of the wire is about 4 mm.

Embodiment 3

In yet another embodiment, a core is made by preparing a raw material of the following composition in weight %:

molybdenum: 5%, tungsten: 8%, graphite: 3%, nickel: 8%, vanadium: 7%, chromium: 39%, sodium silicon fluoride: 13%, niobite: 6%, boron: 9%, silica sand: 5%, and rare earth: 4%.

The raw material was ground into a powder, was stirred thoroughly, and was placed onto a low carbon steel (H08A) strip having a thickness of 0.5 mm. The strip was wound around the powdered core flux material and was pressed to obtain a cylindrical structure. The cylindrical structure was then extruded into a cylindrical wire having a core using an extrusion apparatus. The wire was then drawn out with a wire drawing machine until the diameter of the wire is about 4 mm.

It has been proved from experimental repairs of welding cold rolled metal with the welding wire described in the three embodiments mentioned above, that good results were obtained and that the hardness of each wire is greater than HRC 62.

I claim:

1. A high hardness and wear-resistant flux cored wire comprising a flux core having a composition in weight percentage comprising:

1–10% molybdenum,

1–10% tungsten,

1–10% graphite,

1–7% nickel;

2–10% vanadium;

20–40% chromium;

5–15% sodium silicon fluoride;

1–10% niobite; 10–25% boron;

2–10% silica sand;

1–8% rare earth, and a skin layer consisting of low carbon steel.

2. The wire according to claim 1, wherein said skin layer is made of low carbon steel H08A having a thickness of about 0.25 mm to about 0.6 mm.

3. The wire according to claim 1 or 2, wherein the composition, in weight percentage of said flux core is:

10% molybdenum;

1% tungsten;

1% graphite;

7% nickel;

2% vanadium;

20% chromium;

15% sodium silicon fluoride;

1% niobite;

25% boron;

10% silica sand, and

8% rare earth.

4. A method for manufacturing a high hardness and wear-resistant flux cored wire, comprising the steps of:

preparing a raw material for a flux core comprising the composition of claim 1;

grinding the raw material into a flux core powder;

stirring the ground flux core powder thoroughly;

preparing a low carbon steel strip;

placing said flux core powder onto the steel strip;

wrapping said low carbon steel strip around said flux core powder to form a cylindrical structure containing a powdered core surrounded by a steel tube;

extruding and pressing the cylindrical structure into a cylindrical wire; and drawing said cylindrical wire with a wire drawing machine to decrease the diameter of the wire.

5. The method according to claim 4, wherein said steel strip is made of low carbon steel H08A.

6. The method according to claim 4, wherein the diameter of said wire is in the range of about 1.0 mm to about 4.0 mm.

7. The method according to claim 4, wherein the composition of the flux core consists, in weight percentage, of:

10% molybdenum;

1% tungsten;

1% graphite;

7% nickel;

2% vanadium;

20% chromium;

15% sodium silicon fluoride;

1% niobite;

25% boron;
10% silica sand, and
8% rare earth.

8. A flux cored wire comprising a flux core having a composition, in weight percent, comprising:
1–10% molybdenum;
1–10% tungsten;
1–10% graphite;
1–7% nickel;
2–10% vanadium;
20–40% chromium;
5–15% sodium silicon fluoride;
1–10% niobite;
10–25% boron;
2–10% silica sand, and
1–8% rare earth.

9. The flux core of claim 8, consisting, in weight percent, of:
10% molybdenum;
1% tungsten;
1% graphite;
7% nickel;
2% vanadium;
20% chromium;
15% sodium silicon fluoride;
1% niobite;
25% boron;
10% silica sand, and
8% rare earth.

10. The flux core of claim 8, consisting, in weight percent of:
1% molybdenum;
10% tungsten;
5% graphite;
1% nickel;
10% vanadium;
40% chromium;
5% sodium silicon fluoride;
10% niobite;
1% boron;
2% silica sand, and
1% rare earth.

11. The flux core of claim 8, consisting, in weight percent of:
5% molybdenum;
8% tungsten;
3% graphite;
8% nickel;
7% vanadium;
39% chromium;
13% sodium silicon fluoride;
6% niobite;
9% boron;
5% silica sand, and
4% rare earth.

* * * * *